US011737144B2

(12) United States Patent
Hakola et al.

(10) Patent No.: US 11,737,144 B2
(45) Date of Patent: Aug. 22, 2023

(54) ON MULTIPLE PRACH PREAMBLES AND RANDOM ACCESS RESPONSES

(71) Applicant: Nokia Technologies Oy, Espoo (FI)

(72) Inventors: Sami-Jukka Hakola, Kempele (FI); Emad Farag, Flanders, NJ (US); Samuli Heikki Turtinen, Ii (FI); Jukka Valtteri Tormalehto, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 544 days.

(21) Appl. No.: 16/606,950

(22) PCT Filed: Apr. 26, 2018

(86) PCT No.: PCT/EP2018/060712
§ 371 (c)(1),
(2) Date: Oct. 21, 2019

(87) PCT Pub. No.: WO2018/202536
PCT Pub. Date: Nov. 8, 2018

(65) Prior Publication Data
US 2021/0105822 A1    Apr. 8, 2021

Related U.S. Application Data

(60) Provisional application No. 62/502,076, filed on May 5, 2017.

(51) Int. Cl.
*H04W 4/00*     (2018.01)
*H04W 74/08*    (2009.01)
(Continued)

(52) U.S. Cl.
CPC ..... *H04W 74/0833* (2013.01); *H04W 72/046* (2013.01); *H04W 72/53* (2023.01); *H04W 74/008* (2013.01)

(58) Field of Classification Search
CPC ........... H04W 74/0833; H04W 72/046; H04W 72/0493; H04W 74/008
(Continued)

(56) References Cited

U.S. PATENT DOCUMENTS

2011/0014922 A1    1/2011  Jen .................................. 455/450
2016/0219569 A1    7/2016  Kuo et al. .......................... 72/46
(Continued)

FOREIGN PATENT DOCUMENTS

CA        2748799 A1 *  7/2010  ............ H04W 48/08
CN      103765792 A      4/2014
(Continued)

OTHER PUBLICATIONS

Intel Corporation. "NR Random Access Procedure" 3GPP TSG RAN WG1 #88bis, R1-1706172, Spokane, USA, Apr. 3-7, 2017, pp. 1-8.

*Primary Examiner* — Thai D Hoang
(74) *Attorney, Agent, or Firm* — Joseph C. Drish; Harrington & Smith

(57) ABSTRACT

A method including, detecting, by a base station in a wireless communication system, within an RAR window, at least one of multiple first messages from a plurality of user equipments, wherein the plurality of user equipments is permitted to transmit multiple first messages within the RAR window, and wherein each first message includes a PRACH preamble; in response to receiving at least one PRACH preamble in the at least one of multiple first messages, transmitting at least one second message including an RAR downlink channel for each preamble received; receiving at least one third message, from at least one user equipment of the plurality of user equipments, including a beam connection request and transmitting at least one fourth message to the at least one user equipment on the requested beam.

11 Claims, 2 Drawing Sheets

(51) Int. Cl.
*H04W 72/044* (2023.01)
*H04W 74/00* (2009.01)
*H04W 72/53* (2023.01)

(58) Field of Classification Search
USPC .................................. 370/329–330, 335–345
See application file for complete search history.

(56) References Cited

U.S. PATENT DOCUMENTS

| | | | |
|---|---|---|---|
| 2016/0227575 A1 | 8/2016 | Furuskog et al. | ................. 72/14 |
| 2017/0111886 A1 | 4/2017 | Kim et al. | |
| 2017/0367120 A1* | 12/2017 | Murray | ............. H04W 74/0833 |
| 2018/0054837 A1* | 2/2018 | Islam | ..................... H04W 72/30 |
| 2018/0317264 A1* | 11/2018 | Agiwal | ............... H04W 74/085 |
| 2020/0107235 A1* | 4/2020 | Peisa | ..................... H04W 24/08 |

FOREIGN PATENT DOCUMENTS

| | | | | |
|---|---|---|---|---|
| WO | WO-2016086144 A1 * | 6/2016 | ........... | H04B 7/0617 |
| WO | WO 2017/044155 A1 | 3/2017 | | |
| WO | WO-2017160107 A2 * | 9/2017 | ........... | H04B 7/0695 |
| WO | WO-2018175721 A1 * | 9/2018 | ............ | H04W 24/08 |

* cited by examiner

ON MULTIPLE PRACH PREAMBLES AND RANDOM ACCESS RESPONSES

CROSS REFERENCE TO RELATED APPLICATION

This patent application is a U.S. National Stage application of International Patent Application Number PCT/EP2018/060712 filed Apr. 26, 2018, which claims priority to U.S. provisional application No. 62/502,076 filed May 5, 2017, which are hereby incorporated by reference in their entireties.

TECHNICAL FIELD

This invention relates generally to 3GPP New Radio (NR) physical layer design and, in particular, to Random Access Procedure.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In LTE, there is a four step RACH procedure. In Step 1, MSG1 is sent by a UE to its base station, where the UE selects one of the 64 available RACH preambles. The UE also needs to give its own identity to the network so that network can address it in next step. The identity that UE will use is the RA-RNTI, which is determined from the time slot number in which the preamble is sent. If UE does not receive any response from the network, it increases its power in fixed step and sends RACH preamble again In Step 2, MSG2 is sent by the base station with a RAR to the UE on DL-SCH addressed to RA-RNTI calculated from the timeslot in which preamble was sent. The message carries following information: Temporary C-RNTI for further communication; Timing Advance Value where the base station also informs the UE to change its timing so it can compensate for the round trip delay caused by UE distance from the base station; and an Uplink Grant Resource where the network (through the base station) will assign an initial resource to the UE so that it can use UL-SCH.

In Step 3, using UL-SCH, the UE sends "RRC connection request message" to the base station, where the UE is identified by the temporary C-RNTI assigned in the previous step by base station. The message contains following: a connection establishment cause showing the reason why UE needs to connect to network; and a UE identity using a TMSI or Random Value (because there is possibility that Temp-CRNTI has been assigned to more than one UE in the previous step, due to multiple requests coming at same time), where TMSI is used if the UE has previously connected to the same network since with TMSI value the UE is identified in the core network, and where a random value is used if UE is connecting for the very first time to network.

In Step 4: the base station responds with MSG4 which is a contention resolution message to the UE whose message was successfully received in step 3. This message is addressed towards TMSI value or Random number (from previous steps) but contains the new C-RNTI which will be used for the further communication.

First release of NR will support 4-step RACH procedure, similar to LTE, comprising four messages between gNB/TRP and UE.

In NR, multiple/repeated RACH preambles in a RACH resource are supported where a CP is inserted at the beginning of the consecutive multiple/repeated RACH OFDM symbols, CP/GT between RACH symbols is omitted, and GT is reserved at the end of the consecutive multiple/repeated RACH symbols.

In case the UE has Tx/Rx beam correspondence, the UE can deterministically determine the UL Tx beam used for RACH message 1 (RACH preamble) based on the best DL Rx beam used to receive the synchronization channels or downlink RSs, like CSI-RS or MRS, that are associated with RACH resources. Subsequently, this beam is used to receive the RACH MSG2 (Random Access Response), and transmit RACH MSG3.

In case the UE does not have Tx/Rx correspondence, the UE is not able to determine the best Tx beam to use for RACH message 1 based on the DL Rx beam used to receive the synchronization channels. Instead, the UE randomly or otherwise selects a beam to transmit RACH message 1 and then waits for the RAR to determine if the gNB is able to receive this beam or not. If RAR is not received, then the UE tries a different beam, until it receives the RAR. It can be observed that ACK of Tx/Rx correspondence at the UE, increases access latency.

Baseline procedure in NR is as in LTE where the UE performs one Message 1 transmission and thus there can be only one RAR for UE at a time. The current invention moves beyond the current techniques and/or materials Acronyms or abbreviations that may be found in the specification and/or the drawing figures are defined within the context of this disclosure or as follows below:

3GPP Third Generation Partnership Project
ACK Acknowledgement
CP Cyclic Prefix
CRC Cyclic Redundancy Check
C-RNTI Cell Radio Network Temporary Identity
CSI-RS Channel State Information-Reference Signals
DL Downlink
DL-SCH Downlink Shared Channel
eNB or eNodeB base station, evolved Node B
gNB NR/5G Node B
GT Guard Time
HARQ Hybrid Automatic Repeat Request
LTE Long Term Evolution
LTE-A Long Term Evolution-Advanced
MME Mobility Management Entity
MRS Mobility Reference Signal
MSG Message
NACK Negative Acknowledgement
NCE Network Control Entity
NR New Radio
OFDM Orthogonal Frequency Division Multiplexing
PBCH Physical Broadcast Channel
PDCCH Physical Downlink Control Channel
PDSCH Physical Downlink Shared Channel
PRACH Physical Random Channel
PRB Physical Resource Block
PUCCH Physical Uplink Control Channel
PUSCH Physical Uplink Shared Channel
RACH Random Access Channel
RAR Random Access Response
RA-RNTI Random Access RNTI used for PRACH Response
Rel Release RE Resource Element
RNTI Radio Network Temporary Identifier
RS Reference Signal
RRC Radio Resource Control
Rx Receive, Reception, or Receiver
TS Technical Specification
TRP Transmission reception point
Tx Transmit, Transmission, or Transmitter
UCI Uplink Control Information
UE User Equipment
UL Uplink
UL-SCH Uplink Shared Channel

BRIEF DESCRIPTION OF THE DRAWINGS

In the attached Drawing Figures.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for Random Access Responses in regard to multiple PRACH preambles. The present invention proposes that that a UE, signaling in random access procedure within a given RAR window, is allowed to transmit multiple PRACH preambles until the end of that RAR window and, upon reception of multiple RARs which the UE successfully received or omitted, responding to all received RARs by the UE signaling in MSG3 which RARs belong to that same UE. Additional description of these techniques is presented after a system into which the exemplary embodiments may be used is described.

Figure 1:
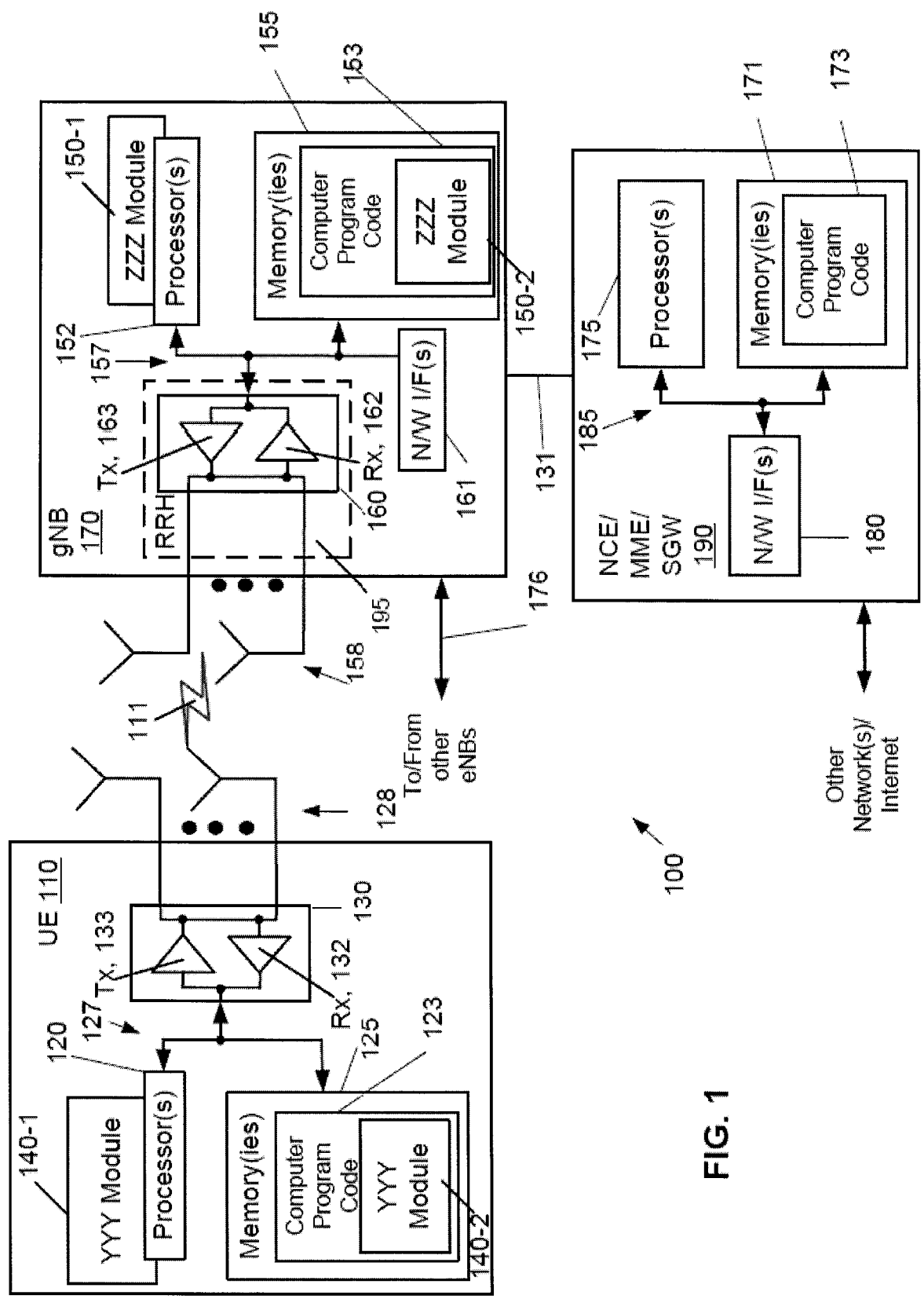
FIG. 1 is a block diagram of an exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The gNB (NR/5G Node B but possibly an evolved NodeB) 170 is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Figure 2:
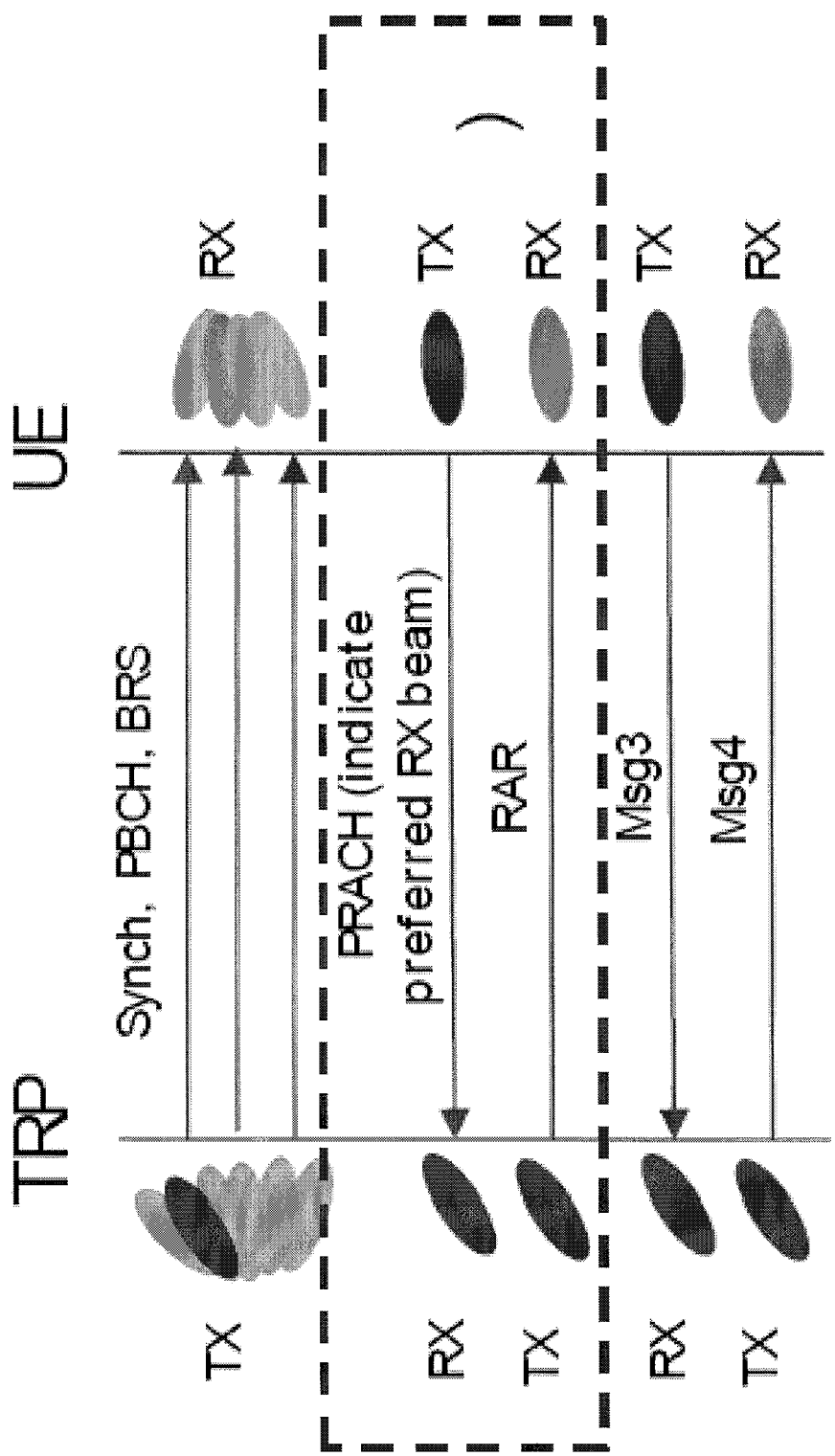
FIG. 2 depicts RACH procedure with no Tx/Rx beam correspondence at the UE.

FIG. 2 illustrates RACH procedure with no Tx/Rx beam correspondence at the UE. As can be seen from the ")" on the right hand side of the diagram, the UE repeats this operation until it receives RAR. The gNB uses the same Tx beam for each PRACH transmission during one full RACH sweep. The received RAR implicitly indicates the best Tx beam to use.

To improve in the access latency, the UE could be allowed to transmit multiple MSG1s within a given RAR window as configured by the network via system information. Agreements from RAN#AH1_NR which states "NR 4-step RACH procedure design should not preclude multiple MSG1 transmissions until the end of RAR window if need arises" and RAN1#88 which states "NR random access design should not preclude UE reception of multiple RAR within a given RAR window, if need arises" reflect this possibility.

A current problem overcome by the present invention is if a UE can transmit multiple MSG1 transmissions, then the gNB cannot determine whether multiple received preambles are from one UE or from multiple UEs. Therefore, the gNB transmits MSG2 (RAR) corresponding to each received PRACH preamble. Subsequently, the UE may receive multiple RARs. Each RAR message may include information about reception quality of detected preamble to aid TX beam selection of the UE. The UE could then select one of the received RARs and transmit MSG3 according to received UL grant carried in the selected RAR.

Another current problem overcome by the present invention is where gNB implementations rely on received MSG3 transmissions when adjusting parameters for RAR message (PDCCH+PDSCH). If the UE drops certain RARs not because of low reception quality but because of what was just discussed above, then the gNB may adjust RAR transmission parameters to be more pessimistic that they should be (e.g., higher aggregation level for the PDCCH and lower coding rate for PDSCH) in the cell.

An even more problematic issue overcome by the present invention exists with the HARQ procedure that is likely applied for RACH MSG3. If a UE drops certain RAR(s) and omits transmitting the corresponding UL PUSCH transmission, then the gNB will nonetheless try to demodulate and decode UL PUSCH according to UL grant it provided in MSG2. Upon unsuccessful decoding (because of no actual transmission) the gNB transmits NACK and UL grant for the retransmission. This procedure may last until the maximum number of retransmissions has taken place. Thus, dropping received RAR and omitting obtained UL grant would lead to unnecessary HARQ feedback and UL grants in downlink thus decreasing the system efficiency. Furthermore, the gNB may wrongly adjust its transmission parameters of RAR (PDCCH+PDCCH) and UL grant parameters in case the UE doesn't use the uplink resources granted by the gNB.

The present invention proposes that a UE, signaling in random access procedure within a given RAR window, is allowed to transmit multiple PRACH preambles until the end of that RAR window and, upon reception of multiple RARs which the UE successfully received or omitted, responding to all received RARs by the UE signaling in MSG3 which RARs belong to that same UE. Based on information received, the gNB synchronizes with UE which RACH procedure to continue and which procedure(s) can be switched off.

The following implementation options are considered in case the gNB has configured UE to be able to transmit multiple MSG1 transmissions until the end of RAR window where one MSG1 transmission means one RACH occasion/preamble index for which the UE uses a single TX beam (multiple MSG1 transmissions in this context would mean multiple RACH occasions for which UE uses different TX beams).

An option would be that MSG3 transmission from a UE includes information about transmitted preambles and/or received RARs.

In one aspect of this option, there could be information explicitly pointing to received RARs that are identified by time-frequency-preamble index triple of the PRACH preamble to which RAR is associated (RAR carries triple information). Via this information, the gNB gets information about which given UL grants can be omitted. To reduce the signaling overhead, there could be a shortened identity corresponding to PRACH preamble time-frequency-preamble index triple. This identity could be a temporary identifier that can point to transmitted PRACH preamble of certain time window.

In another aspect of this option, there could be information indicating how many RARs the UE has dropped. For instance, a 2-bit indication would allow 4 RARs (and PRACH preamble transmissions) within RAR window. As such, MSG3 would indicate that UE has dropped either 0, 1, 2 or 3 RARs. However, this method has significant drawback that the gNB might not know which RARs were omitted if it sent RARs to other UEs that were missed.

An option would be that PRACH preambles/occasions are grouped so that there is one RAR per multiple PRACH preamble/occasions detections at gNB. In an aspect of this option, RAR content would then indicate which of the detected preambles was received with highest power, by using for example a simple n-bit index among the number of PRACH occasions. In another aspect of this option, a UE would determine only one RA-RNTI to listen for RAR, for example, based on the first or last PRACH occasion used. In other words, the gNB would determine RA-RNTI used for NR-PDCCH CRC masking based on certain time-frequency resource of the set of PRACH preambles/occasions belonging to the same group. However, this option has a drawback that preamble capacity is decreased.

An option would be that the UE transmits MSG3s according to all received RARs. In each MSG3 the UE indicates all of its MSG3 transmissions by having including, for example, RAR IDs according to which it transmitted MSG3s An option would be that the UE includes in each MSG3 the same temporary identifier using which the gNB may determine that there are multiple MSG3s from the same UE and in addition the UE indicates the preferred RAR to indicate the preferred downlink beam for MSG4. The gNB would then continue transmitting one MSG4 to UE from which it received multiple MSG3s using the indicated preferred downlink beam.

gNB Procedures:

A gNB configures in system information whether or not a UE is allowed to transmit multiple MSG1 transmissions. If the UEs are allowed to transmit multiple MSG1 transmissions, then the system information also indicates that how many messages the UE may send until the end of the RAR window. The gNB receives PRACH preambles and transmits RAR on each detected preamble. If the PRACH preambles are grouped, then the gNB prepares and transmits one RAR per detected PRACH preamble group.

A gNB that receives MSG3 transmission from UE determines, based on the message, which RARs have been omitted and takes that information into account if there are pending HARQ processes corresponding to omitted RARs, for example, internal algorithms adjusting parameters for NR-PDCCH and NR-PDSCH used to transmit RAR. If the UE transmits MSG3 corresponding to each received RAR, then the gNB determines from MSG3 the preferred downlink beam for MSG4 and transmits only one MSG4 to the UE.

UE Procedures:

A UE determines from system information whether it can transmit multiple MSG1 transmissions until the end of RAR window.

If the UE is allowed to transmit multiple MSG1 transmissions using different Tx beams until the end of RAR window, then the RACH resource selection will indicate preferred downlink beam which has been determined based on downlink measurements from SS blocks or cell-specific CSI-RSs before RACH transmissions take place. The UE may receive multiple RARs and act with the following alternatives:

1. The UE generates one MSG3 based on one received RAR and omits other RARs. The UE includes in MSG3 which RARs it has omitted or only the amount of RARs it has omitted 2. The UE generates MSG3 corresponding to each received RAR and includes in each MSG3 the same identifier (such as a temporary UE identifier) and information which RAR beam was preferable for MSG4. From this information, the gNB is able to shut down other pending RACH procedures that were running with the UE.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is the added functionality.

It is also noted herein that while the above describes example embodiments of the invention, these descriptions should not be viewed in a limiting sense. Rather, there are several variations and modifications which may be made without departing from the scope of the present invention.

What is claimed is:

1. A method comprising:
    transmitting, to at least one user equipment in a wireless communications network, permission to transmit multiple first messages within a random access response window;
    receiving, from the at least one user equipment, multiple first messages within the random access response window, wherein a respective one of the multiple first messages comprises a respective physical random access channel preamble;
    detecting, by a base station in a wireless communication system, within the random access response window, at least one of the multiple first messages from a plurality of user equipments, wherein the plurality of user equipments is permitted to transmit the multiple first messages within the random access response window;
    in response to receiving at least one physical random access channel preamble in the at least one of multiple first messages, transmitting at least one second message comprising a random access response downlink channel for a respective preamble received;
    receiving at least one third message, from the at least one user equipment of the plurality of user equipments, comprising a beam connection request;
    after receiving the at least one third message, determining a preferred downlink reception beam of a respective user equipment of the plurality of user equipments; and
    transmitting at least one fourth message to the at least one user equipment on the preferred downlink reception beam of the respective user equipment.

2. The method of claim 1, further comprising:
    transmitting multiple random access responses to a respective user equipment of the plurality of user equipments; and
    determining, for the respective user equipment, which of the multiple random access responses a respective user equipment has omitted; and
    determining, for the respective user equipment, to discontinue at least one random access channel procedure, based on which of the multiple random access responses the respective user equipment has omitted.

3. The method of claim 1, wherein the determining of the preferred downlink reception beam of a respective user equipment is based on a difference between a number of second messages sent to the respective user equipment and a number of third messages received from the respective user equipment.

4. The method of claim 1, wherein the determining of the preferred downlink reception beam of a respective user equipment is based on the at least one third message indicating the preferred downlink reception beam.

5. The method of claim 1, further comprising:
    based on the determining of the preferred downlink reception beam of a respective user equipment, shutting down other pending random access channel (RACH) procedures with the respective user equipment on non-preferred beams.

6. The method of claim 1, wherein, in response to a respective at least one first message comprising physical random access channel (PRACH) preambles being grouped instead of comprising a PRACH preamble, the at least one second message comprises a random access response (RAR) for a respective PRACH preamble group.

7. A method comprising:
    obtaining, by a user equipment in a wireless communications network, permission to transmit multiple first messages within a random access response window;
    transmitting to a base station multiple first messages within the random access response window, wherein a respective one of the multiple first messages comprises a respective physical random access channel preamble;
    receiving from the base station at least one second message, wherein a respective one of the at least one second message comprises a respective random access response for a respective preamble;
    transmitting at least one third message comprising a beam connection request; and
    receiving at least one fourth message on a preferred downlink reception beam of the user equipment.

8. The method of claim 7, wherein the at least one third message is only one message based on one received random access response (RAR) and omitting other random access responses (RARs) with an indication of the omitted RARs.

9. The method of claim 7, wherein the at least one third message comprises a message corresponding to a respective received random access response (RAR), and identifying a preferred RAR for downlink.

10. A computer program product comprising a non-transitory computer-readable medium tangibly embodying computer program code for use with a computer, the computer program code comprising instructions executable with a machine for performing operations, the operations comprising:
    transmitting, to at least one user equipment in a wireless communications network, permission to transmit multiple first messages within a random access response window;
    receiving, from the at least one user equipment, multiple first messages within the random access response window, wherein a respective one of the multiple first messages comprises a respective physical random access channel preamble;
    detecting, by a base station in a wireless communication system, within the random access response window, at least one of the multiple first messages from a plurality of user equipments, wherein the plurality of user equipments is permitted to transmit the multiple first messages within the random access response window;
    in response to receiving at least one physical random access channel preamble in the at least one of multiple first messages, transmitting at least one second message comprising a random access response downlink channel for a respective preamble received;

receiving at least one third message, from the at least one user equipment of the plurality of user equipments, comprising a beam connection request;

after receiving the at least one third message, determining a preferred downlink reception beam of a respective user equipment of the plurality of user equipments; and transmitting at least one fourth message to the at least one user equipment on the preferred downlink reception beam of the respective user equipment.

11. A computer program product comprising a non-transitory computer-readable medium tangibly embodying computer program code for use with a computer, the computer program code comprising instructions executable with a machine for performing operations, the operations comprising:

obtaining, by a user equipment in a wireless communications network, permission to transmit multiple first messages within a random access response window;

transmitting to a base station multiple first messages within the random access response window, wherein a respective one of the multiple first messages comprises a respective physical random access channel preamble;

receiving from the base station at least one second message, wherein a respective one of the at least one second message comprises a respective random access response for a respective preamble;

transmitting at least one third message comprising a beam connection request; and receiving at least one fourth message on a preferred downlink reception beam of the user equipment.

* * * * *